Apr. 10, 1923.
E. G. SHADER.
AUTOMATIC BOILER CONTROL
Filed Apr. 25, 1922
1,451,274
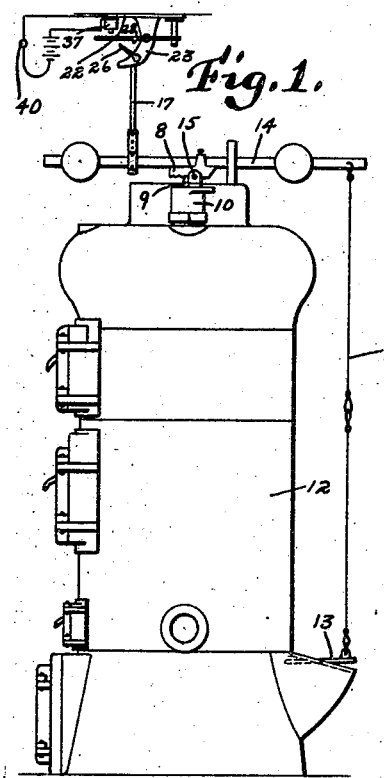
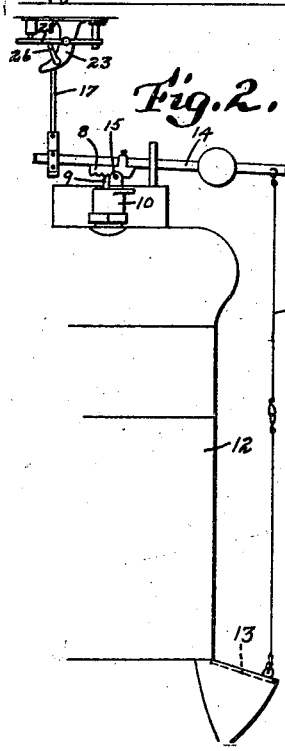
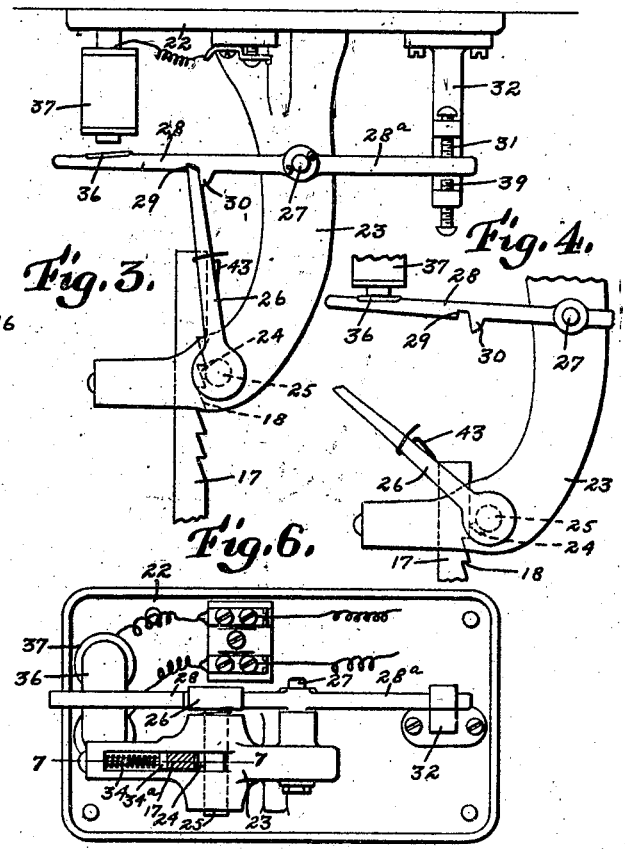
Inventor:
Edmund G. Shader
attys.

Patented Apr. 10, 1923.

1,451,274

UNITED STATES PATENT OFFICE.

EDMUND G. SHADER, OF BROCKTON, MASSACHUSETTS.

AUTOMATIC BOILER CONTROL.

Application filed April 25, 1922. Serial No. 556,444.

*To all whom it may concern:*

Be it known that I, EDMUND G. SHADER, a citizen of the United States, residing at Brockton, in the county of Plymouth and State of Massachusetts, have invented new and useful Improvements in Automatic Boiler Controls, of which the following is a specification.

This invention relates to heating apparatus employing hot water or steam as the heating medium, and provided with an automatic boiler control, comprising a draft damper, and a two-armed weighted lever fulcrumed on a support above the damper, to oscillate in a vertical plane, one arm of said lever being connected with the damper, and lowered when the damper is closed, and the other arm being raised when the damper is closed, the lever being movable by the expansion and contraction of the heating medium, and the construction and arrangement being such that the damper is automatically closed and opened by variations of heat.

Automatic controls operating as above indicated, are well known and in common use.

My invention has for its object to provide mechanism whereby the control lever, when moved to its damper-closing position, may be locked in said position, and unlocked or released from a distant point, and permitted to open the draft damper, so that a householder desiring an increase of heat early in the morning, may obtain the same by a manual operation, such as the closing of an electric circuit in his room, without going to the basement where the boiler is located, such operation releasing the control lever from its damper-closing position, and permitting it to open the damper.

The invention is embodied in the improved mechanism hereinafter described and claimed, adapted to be set for action by a movement of the control lever to its damper-closing position, and to be released, or let off to release the control lever and permit the latter to open the damper at any time elected by an operator, at a location more or less remote from the boiler.

Of the accompanying drawings forming a part of this specification,—

Figure 1 is a side elevation of a heating apparatus, which includes a boiler and a boiler control of well known type, and a side elevation of an automatic mechanism embodying the invention, associated with the control lever, the draft damper being open.

Figure 2 is a view similar to portions of Figure 1, the draft damper being closed.

Figure 3 is a side elevation of the mechanism embodying the invention, on a larger scale, a portion of the bar hereinafter described being broken away, the said mechanism being set for action.

Figure 4 is a view similar to a portion of Figure 3, showing the mechanism released or let off.

Figure 5 is a perspective view of the tripping device hereinafter described.

Figure 6 is a bottom plan view of the mechanism as shown by Figure 3, the bar being shown in section.

Figure 7 is a section on line 7—7 of Figure 6.

Figure 8 is a side view showing the lower end portion of the bar, and a portion of the control lever.

Figure 9 is a section on line 9—9 of Figure 8.

The same reference characters indicate the same parts in all of the figures.

In the drawings, 12 designates a heating boiler, which may be either of the steam-generating and circulating, or water-heating and circulating type, and is provided with a boiler control which includes a pivoted draft damper 13, governing the admission of air below the grate, and a lever 14 fulcrumed at 15 above the boiler. In the boiler here shown, the fulcrum 15 is fixed, and engages the notched edge of a shoe 8 on which the lever 14 bears loosely and is longitudinally adjustable, the shoe being in effect a part of the lever. A plunger 9 is movable vertically in a fixed cylinder 10, by variations of pressure in the boiler, and bears on the shoe 8 at one side of the fulcrum, to swing the lever on the fulcrum as the pressure varies. The parts 8, 9 and 10 are elements of a well known boiler control, and need not be more fully shown and described. One arm of the control lever 14, called for convenience the inner arm, is coupled by a connection 16 with the damper, and is swung downward to close the damper, the other arm, called the outer arm, being raised when the lever is in its damper-closing position, as shown by Figure 2. When the inner arm is raised the damper is opened. The boiler control, whether embodied as above indicated, or otherwise, is automatically operative by variations of the temperature and pressure of the heating medium, so that the draft damper may be automatically opened and closed to alternately promote and check combustion.

The mechanism of my invention is embodied as next described. 17 represents a bar having ratchet teeth 18, and coupled at one end to the other arm of the lever 14. The bar is preferably composed of sections connected by a pivot 19, the lower section being provided with clamping means, such as a plate 20, and screws 21, whereby it is rigidly and detachably secured to the lever. The upper section of the bar having the ratchet teeth is therefore pivotally connected with the lever, and adapted to swing toward and from the locking dog next described.

A fixed holder, which is preferably a bracket, composed of a base 22, and an arm 23, is rigidly secured to a ceiling above the boiler, the arm 23 projecting downward from the base. Pivoted to oscillate on said holder is a tripping device, shown independently by Figure 5, and including a short locking dog 24, a rock shaft 25, journaled in a bearing in the bracket arm 23, and a longer detent dog 26, the said dogs being coaxial, and one much shorter than the other. Pivoted on a stud 27, on the bracket arm, is a detent 28, which is one arm of a two-armed lever, including also an arm 28$^a$. The detent 28 is provided with a shoulder 29, and with a stop projection 30, whereby it is adapted to cooperate with the detent dog 26. The detent is normally supported yieldingly in the operative position shown by Figure 3, by a stop screw or member 31, cooperating with the arm 28$^a$, as shown, and supported by an ear 32, attached to the bracket base, the detent being adapted to yield and swing upward from its operative position. When the detent is thus supported, it is adapted to automatically engage the detent dog 26, when the latter is swung from the position shown by Figure 4, to that shown by Figure 3, the dog first swinging the detent slightly upward until it passes under the shoulder 29. The detent then drops to engage the shoulder with the dog, so that the dog is immovably confined between said shoulder and the stop 30. The locking dog 24 is formed to engage a tooth 18, of the bar 17, when the detent dog is confined, and thus support the bar 17 against downward movement.

The bracket arm 23 is provided with a spring 34, having a shoe 34$^a$ in sliding contact with the bar and pressing the toothed side thereof against the locking dog, the bar being movable edgewise in a slot or guide 35 (Figure 7) in the bracket arm.

I provide means manually operable from a distant point for displacing the detent and thus releasing the dogs 26 and 25, and allowing the bar 17 to drop, said means preferably including an armature 36 attached to the detent, and an electro-magnet 37 attached to the bracket base 22, and arranged to attract the armature, when energized, and thus raise the detent as shown by Figure 4. This movement of the armature may be limited by a lower stop screw 39, engaged with the ear 32, and cooperating with the arm 28$^a$, to prevent the armature from contacting with the poles of the magnet, and being held by residual magnetism when the magnet is demagnetized. The magnet is included in an electric circuit shown diagrammatically by Figure 1, and including a circuit-closing push-button 40, which may be located in a room above a basement containing the boiler.

The ratchet teeth 18 are formed to slip on the locking dog when the bar 17 is moved upward, so that the dog does not oppose movement of the bar when the control lever is moving to its damper-closing position, and is adapted to lock the bar and prevent movement of the control lever to its damper-opening position.

It will now be seen that when the damper is closed and the bar 17 is raised and locked, an operator at a distant point may cause the opening of the damper by manipulating the push-button 40, and thus displacing the detent 28, whereupon the dogs are swung downward by the downward pull exerted on the locking dog 24, by the ratchet tooth engaged therewith. When the control lever is in its damper-opening position, the bar 17, pressed by the spring 34 against the locking dog, holds the dogs in the position shown by Figure 4, so that the mechanism of my invention remains inoperative until the bar 17 is raised by the return of the control lever to its damper-closing position. A biasing spring is provided to return the dogs to their operative position shown by Figure 3, when the bar 17 is raised, so that the said mechanism is automatically set for action. The spring has a coiled portion 42, encircling the rock shaft 25, and attached at one end to the bracket arm 23, and an arm portion 43, bearing on the detent dog 26, and adapted to move the latter to the position shown by Figure 3, when the bar 17 is raised, the biasing spring being weaker than the bar-pressing spring 34, so that it is prevented from acting when the bar is lowered.

The control lever 14 may be manually moved to its damper-closing position by an attendant, before leaving the boiler for the night, the bar 17 being thus raised, so that the mechanism of my invention locks the lever in its damper-closing position until the detent 28 is displaced. When it is desired to leave the control lever free to be automatically oscillated during the period when a uniform maximum degree of heat is required, the tripping device may be manually moved to swing the dogs 24 and 26 downward from the positions shown by Figure 4, so that the bar 17 will contact only with the rounded surface of the rock shaft 25, and is free to move vertically in either direction.

I claim:

1. Locking and releasing mechanism for the damper-operating lever of an automatic boiler control, said mechanism comprising a holder adapted to be attached to a support above a boiler, a movable detent and a movable tripping device, each pivoted on the holder, the detent being normally held in position to lock the tripping device, and displaceable from said position, a bar having means at one end for engagement with said lever, guided in a vertical path by the holder, and yieldingly pressed toward the tripping device, the detent and the tripping device having complemental interengaging means whereby the tripping device may be locked when the detent is in its normal position, the bar and the tripping device having complemental interengaging means adapted to lock the bar against downward movement when the tripping device is locked, and to permit free upward movement of the bar, and detent displacing means operable from a distant point to displace the detent, and thereby release the tripping device and the bar, the arrangement being such that when the tripping device is locked and the bar raised, the lever is locked in its damper-closing position, and when the tripping device is released, the bar drops and permits the lever to open the damper.

2. Locking and releasing mechanism for an automatic boiler control, which includes a draft damper and a damper-controlling lever, said mechanism comprising a holder adapted to be attached to a fixed support above a boiler, and provided with a guide, a movable detent normally suported in an operative position on the holder and displaceable therefrom, a ratchet-toothed bar movable vertically and laterally in said guide, and provided at one end with means for connection with said lever, a tripping device pivoted to the holder and including a short bar-locking dog in said guide and engageable with a tooth of said bar, and a longer detent dog, adapted to be locked by the detent, means yieldingly pressing the bar toward the locking dog, the teeth of the bar being formed to slip on said dog when the bar is rising, means yieldingly holding the tripping device with its dogs in their operative positions, and detent-displacing means operable from a distant point to displace the detent, and thereby release the tripping device and the bar, the arrangement being such that when the tripping device is locked and the bar raised, the lever is locked in its damper-closing position, and when the tripping device is released, the bar drops and permits the lever to open the damper.

3. Locking and releasing mechanism substantially as specified by claim 1, the said displacing means including an armature fixed to the detent, and an electro-magnet fixed to the said holder, and arranged to attract the armature and thereby displace the detent.

4. Locking and releasing mechanism substantially as specified by claim 1, the yielding pressure of the said bar toward the tripping device being caused by a spring mounted on said holder, and in sliding contact with the bar.

5. Locking and releasing mechanism substantially as specified by claim 2, the means yieldingly holding the dogs of the tripping device in their operative positions being a biasing spring attached to said holder, and exerting a yielding pressure on the detent dog.

6. Locking and releasing mechanism substantially as specified by claim 1, the said bar being provided with a pivoted terminal having clamping means whereby it is detachably coupled to the control lever.

7. Locking and releasing mechanism substantially as specified by claim 2, the said detent being provided with a dog stop which arrests the detent dog in its detent-engaging position, and the said holder being provided with a detent stop which arrests the detent in its operative position.

In testimony wherof I have affixed my signature.

EDMUND G. SHADER.